United States Patent
Noda

(10) Patent No.: US 8,592,937 B2
(45) Date of Patent: Nov. 26, 2013

(54) PYROELECTRIC DETECTOR, PYROELECTRIC DETECTION DEVICE, AND ELECTRONIC INSTRUMENT

(75) Inventor: Takafumi Noda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 2 days.

(21) Appl. No.: 13/371,648

(22) Filed: Feb. 13, 2012

(65) Prior Publication Data

US 2012/0211857 A1 Aug. 23, 2012

(30) Foreign Application Priority Data

Feb. 23, 2011 (JP) .................................. 2011-036671

(51) Int. Cl.
*H01L 35/00* (2006.01)

(52) U.S. Cl.
USPC ............. 257/467; 257/35; 257/486; 257/295; 257/296; 438/476; 438/396

(58) Field of Classification Search
USPC .......................................... 257/295, 296, 467
See application file for complete search history.

(56) References Cited

U.S. PATENT DOCUMENTS

| | | | |
|---|---|---|---|
| 5,099,120 A * | 3/1992 | Turnbull | 250/338.2 |
| 5,122,666 A * | 6/1992 | Turnbull | 250/338.3 |
| 6,198,119 B1 * | 3/2001 | Nabatame et al. | 257/295 |
| 6,762,446 B2 * | 7/2004 | Amiotti et al. | 257/296 |
| 6,906,367 B2 * | 6/2005 | Matsuura et al. | 257/295 |
| 7,242,440 B2 * | 7/2007 | Kurashina et al. | 349/44 |
| 7,309,865 B2 * | 12/2007 | Ikushima et al. | 250/338.1 |
| 2001/0028035 A1 * | 10/2001 | Iida et al. | 250/338.4 |
| 2002/0005485 A1 * | 1/2002 | Hashimoto et al. | 250/338.1 |
| 2004/0033672 A1 * | 2/2004 | Matsuura et al. | 438/396 |
| 2005/0006584 A1 * | 1/2005 | Kawakubo et al. | 250/338.2 |
| 2007/0296008 A1 * | 12/2007 | Natori | 257/295 |
| 2011/0210414 A1 * | 9/2011 | Nakatani | 257/467 |
| 2011/0316113 A1 * | 12/2011 | Noda | 257/467 |
| 2012/0018635 A1 * | 1/2012 | Takizawa et al. | 250/338.3 |
| 2012/0213245 A1 * | 8/2012 | Noda | 374/44 |
| 2012/0217400 A1 * | 8/2012 | Noda | 250/338.3 |
| 2012/0217401 A1 * | 8/2012 | Noda | 250/338.3 |

FOREIGN PATENT DOCUMENTS

EP 0827216 A2 3/1998
JP 10-104062 A 4/1998

* cited by examiner

*Primary Examiner* — Fernando L Toledo
*Assistant Examiner* — Jaehwan Oh
(74) *Attorney, Agent, or Firm* — Global IP Counselors, LLP

(57) ABSTRACT

A pyroelectric detector includes a substrate, a support member and a pyroelectric detection element, which includes a capacitor, first and second reducing gas barrier layers, an insulating layer, a plug and a second electrode wiring layer. The first reducing gas barrier layer covers at least a second electrode and a pyroelectric body of the capacitor, and has a first opening that overlaps the second electrode in plan view. The insulating layer covers at least the first reducing gas barrier layer, and has a second opening that overlaps the first opening in plan view. The plug is disposed in the first and second openings and connected to the second electrode. The second electrode wiring layer is formed on the insulating layer and connected to the plug. The second reducing gas barrier layer is formed on the insulating layer and the second electrode wiring layer and covers at least the plug.

20 Claims, 11 Drawing Sheets

PYROELECTRIC DETECTOR, PYROELECTRIC DETECTION DEVICE, AND ELECTRONIC INSTRUMENT

CROSS-REFERENCE TO RELATED APPLICATIONS

This application claims priority to Japanese Patent Application No. 2011-036671 filed on Feb. 23, 2011. The entire disclosure of Japanese Patent Application No. 2011-036671 is hereby incorporated herein by reference.

BACKGROUND

1. Technical Field

The present invention relates to a pyroelectric detector, a pyroelectric detection device, and an electronic instrument.

2. Related Art

Pyroelectric infrared detectors are known as a thermal-type detector. Pyroelectric infrared detectors utilize an effect whereby the pyroelectric body undergoes a change in spontaneous polarization level due to the change in temperature in the pyroelectric body in accordance with the amount of infrared light that is received (pyroelectric effect or pyroelectronic effect), and infrared light is detected as a result of the generation of pyroelectric current (change in surface charge due to the change in polarization level) in both terminals of the pyroelectric body. The process for producing pyroelectric infrared detectors is complicated in comparison to bolometer type infrared detectors, but they have the advantage of superior detection sensitivity.

Pyroelectric infrared detectors have infrared detection elements that contain capacitors that are formed from a pyroelectric body that is connected to an upper electrode and a lower electrode. Various types of electrode and pyroelectric body materials, as well as electrode wiring structures, have been offered (Japanese Laid-Open Patent Application Publication No. 10-104062).

In addition, because the infrared detection element is mounted on a membrane (support member), and a cavity is formed between the membrane and the substrate on which the infrared detector is formed, the infrared detection element is thermally isolated from the substrate.

The pyroelectric body is an oxide, and its pyroelectric effect is lost when the pyroelectric body is reduced by reducing gas during use or during production of the detector.

SUMMARY

In accordance with a number of aspects of the present invention, a pyroelectric detector, a pyroelectric detection device, and an electronic instrument are offered whereby it is possible to prevent loss of the pyroelectric effect due to reduction of the pyroelectric body by reducing gas.

A pyroelectric detector according to one aspect of the present invention includes a substrate, a support member, and a pyroelectric detection element supported on the support member. The pyroelectric detection element includes a capacitor, a first reducing gas barrier layer, an insulating layer, a plug, a second electrode wiring layer and a second reducing gas barrier layer. The capacitor has a first electrode mounted on the support member, a second electrode opposed to the first electrode, and a pyroelectric body disposed between the first and second electrodes. The first reducing gas barrier layer covers at least the second electrode and the pyroelectric body of the capacitor, and has a first opening that overlaps the second electrode in plan view. The insulating layer covers at least the first reducing gas barrier layer, and has a second opening that overlaps the first opening of the first reducing gas barrier layer in plan view. The plug is disposed in the first opening of the first reducing gas barrier layer and the second opening of the insulating layer with the plug being connected to the second electrode. The second electrode wiring layer is formed on the insulating layer and connected to the plug. The second reducing gas barrier layer is formed on the insulating layer and the second electrode wiring layer with the second reducing gas barrier layer covering at least the plug.

In this aspect of the present invention, the first reducing gas barrier layer that covers the capacitor is closed and does not have a hole (first opening) during formation of the interlayer insulating layer (insulating layer), and so reducing gas does not enter into the capacitor during formation of the interlayer insulating layer. However, after the first opening is formed in the first reducing gas barrier layer, the barrier properties deteriorate. In order to prevent this from occurring, a second reducing gas barrier layer 260 is also provided. The second reducing gas barrier layer makes up for the degradation in barrier properties due to the deficiency in the first reducing gas barrier layer that is produced by the forming of the first opening. It is thus sufficient for the second reducing gas barrier layer to be formed so that it covers at least the plug that fills the first and second openings.

In another aspect of the present invention, the second reducing gas barrier layer is preferably formed on the insulating layer and the second electrode wiring layer with the second reducing gas barrier layer covering the first reducing gas barrier layer. In order to prevent wraparound of reducing gas, the second reducing gas barrier layer is formed over a large area covering the first reducing gas barrier layer.

In another aspect of the present invention, the second reducing gas barrier layer is preferably thinner than the first reducing gas barrier layer.

Because the second reducing gas barrier layer is formed as a thin layer, it supports the function of allowing light to pass through to the interlayer insulating film having the function of a light-absorbing layer, or does not contribute to the release of capacitor heat.

In another aspect of the present invention, the pyroelectric detection element preferably further includes a light-absorbing member disposed in a region further upstream in a light incidence direction than the second reducing gas barrier layer, and the second reducing gas barrier layer is formed between the insulating layer and the light-absorbing member.

As a result, wraparound of reducing gas can be prevented, because the second reducing gas barrier layer is formed over a large area. In addition, migration of reducing gas used during etching of the light-absorbing member toward the pyroelectric body can be blocked by the second reducing gas barrier layer.

In another aspect of the present invention, the pyroelectric detection element preferably further includes a third reducing gas barrier layer covering the light-absorbing member, the third reducing gas barrier layer being thicker than the second reducing gas barrier layer.

Although it is necessary for the third reducing gas barrier layer to conduct light to the light-absorbing member and to ensure light transmission, it is made thicker than the second reducing gas barrier layer in order to provide the function of an etching stop layer during shape processing of the support member and the like.

In another aspect of the present invention the first, second, and third reducing gas barrier layers are preferably made of aluminum oxide.

Although other layers such as silicon nitride layers can also manifest the function of a reducing gas barrier layer, their effects are minimal unless they are formed as thick layers. Aluminum oxide is preferred in order to attain the desired thinness of the second reducing gas barrier layer while maintaining the thickness relationships between the first, second, and third reducing gas barrier layers described above.

A pyroelectric detection device in another aspect of the present invention has a configuration in which the pyroelectric detectors described above are arranged two-dimensionally along two intersecting axes. This pyroelectric detection device has increased detection sensitivity in the pyroelectric detectors of each cell and can thus provide clear light (temperature) distribution images.

An electronic instrument in yet another aspect of the present invention has the pyroelectric detectors or the pyroelectric detection device described above. By using one or a plurality of cells containing the pyroelectric detectors as a sensor, the invention is optimal for use in thermographic devices that output a light (heat) distribution image, automobile navigation or surveillance cameras, as well as analytical instruments (measurement instruments) for analyzing (measuring) physical data related to an object, security instruments for detecting fire or heat, and factory automation (FA) instruments that are installed in factories and the like.

BRIEF DESCRIPTION OF THE DRAWINGS

Referring now to the attached drawings which form a part of this original disclosure.

DETAILED DESCRIPTION OF EXEMPLARY EMBODIMENTS

Preferred embodiments of the present invention are described in detail below. The present invention described in the claims is not unfairly limited by the embodiments described below, and the entireties of the configurations described in the embodiments are not necessarily essential in regard to means for solving the problems according to the present invention.

1. PYROELECTRIC INFRARED DETECTION DEVICE

Figure 1:
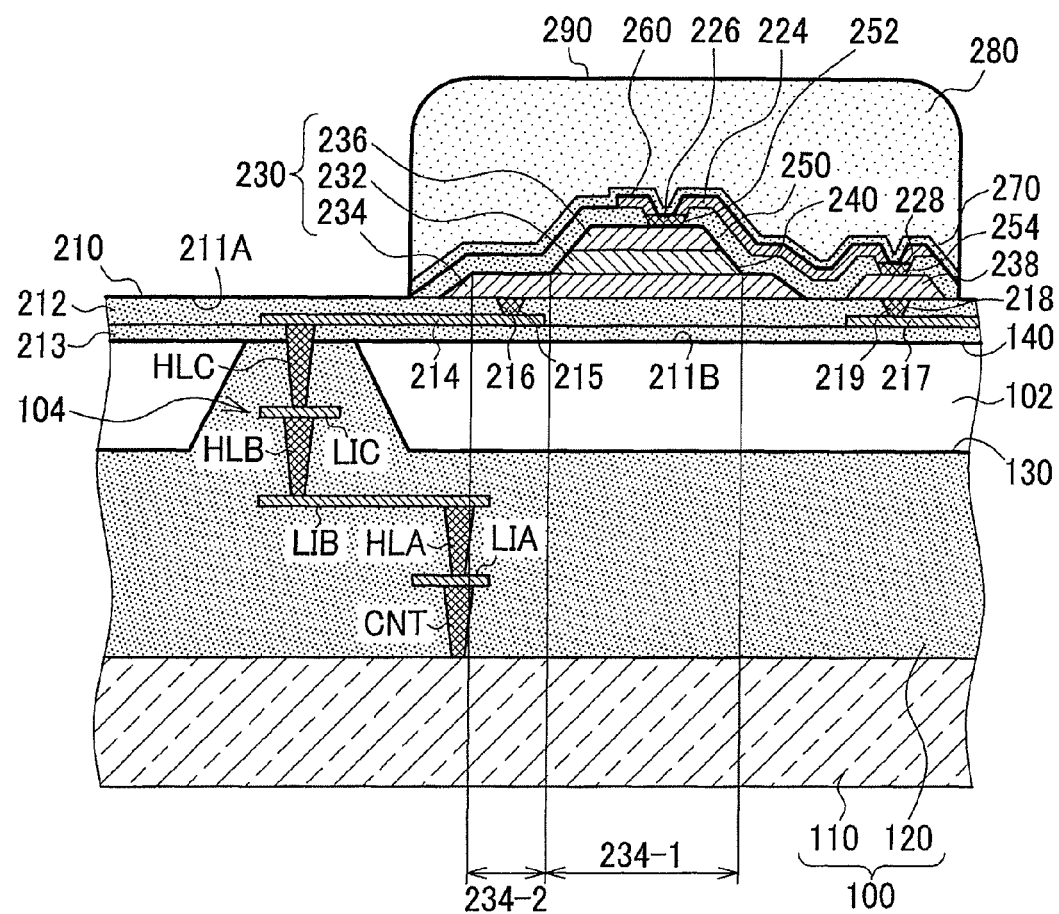
FIG. 1 is a conceptual sectional view of the pyroelectric detector for one cell in a pyroelectric infrared detection device according to an embodiment of the present invention.
Figure 2:
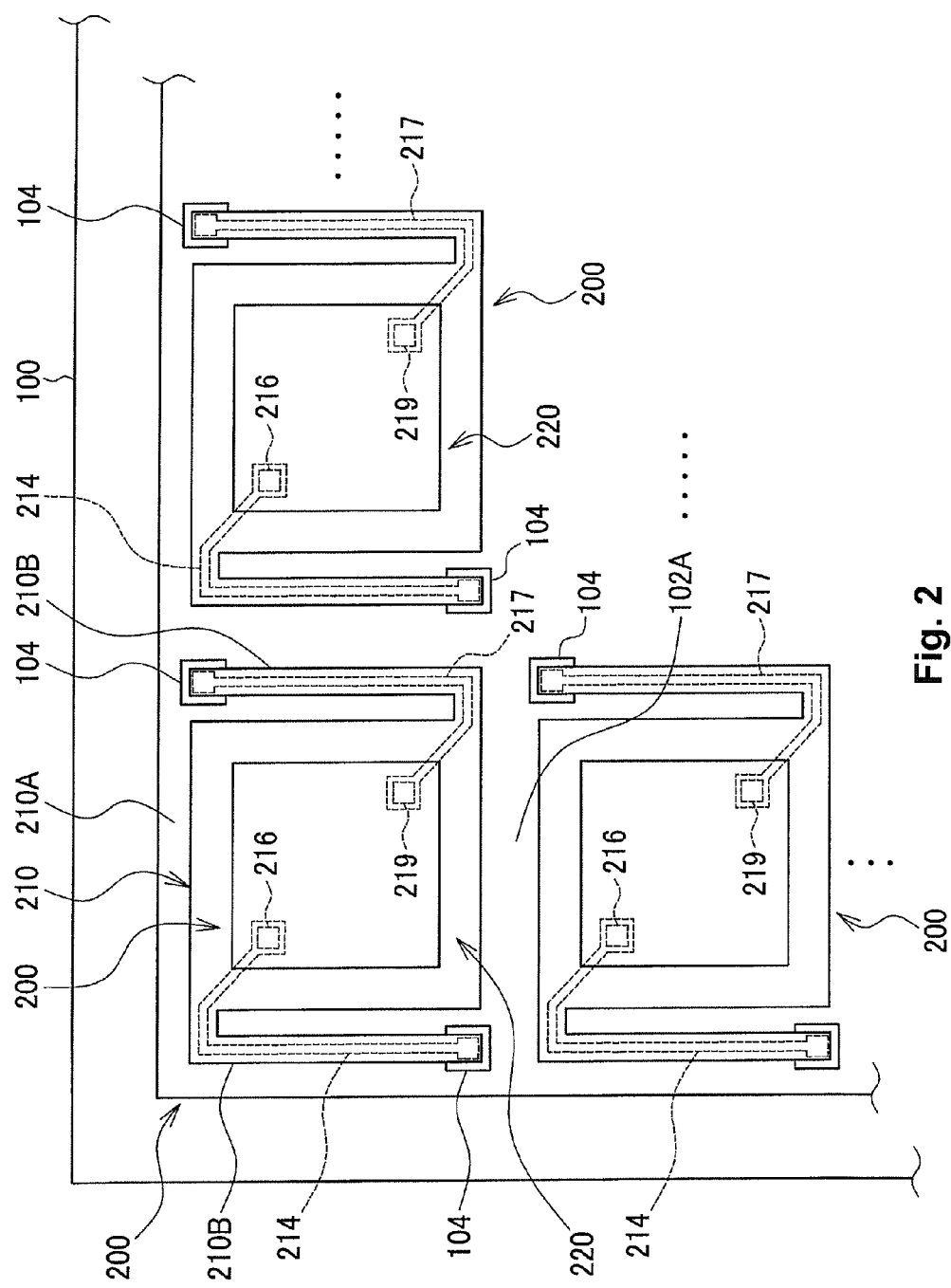
FIG. 2 is a conceptual plan view of a pyroelectric infrared detection device according to an embodiment of the present invention.

FIG. 2 shows a pyroelectric infrared detection device (more broadly, a pyroelectric detection device) that has, arranged in a plurality of units along two lines, e.g., along two orthogonal axes, pyroelectric infrared detectors 200 of a plurality of cells in which the support member 210 shown in FIG. 1 and the pyroelectric detection element 220 mounted thereupon are provided for each cell. A configuration may also be used in which the pyroelectric infrared detection device has only one pyroelectric infrared detector cell. In FIG. 2, a plurality of posts 104 are erected on the substrate 100, and the pyroelectric infrared detectors 200 of the cells are supported on, for example, two posts (spacer members) 104 and are arranged along two orthogonal axes. The region taken up by the pyroelectric infrared detector 200 of a single cell is, for example, 30×30 μm.

As shown in FIG. 2, the pyroelectric infrared detector 200 comprises a support member (membrane) 210 that is supported on two posts 104, and an infrared detection element (more broadly, a pyroelectric detection element) 220. The region taken up by the pyroelectric infrared detection element 220 of a single cell is, for example 20×20 μm.

The pyroelectric infrared detector 200 of a single cell is connected with the two posts 104 and is otherwise not in contact with anything else, with a cavity 102 (refer to FIG. 1) being formed under the pyroelectric infrared detector 200. An opening 102A that is in communication with the cavity 102 is disposed at the periphery of the pyroelectric infrared detector 200 in plan view. As a result, the pyroelectric infrared detector 200 of a single cell is thermally isolated from the substrate 100 and pyroelectric infrared detectors 200 of other cells. In other words, the posts 104 function as spacer members for forming the cavity 102 between the support member 210 and the substrate 100. The spacer member has a prescribed height over the substrate from the surface of the substrate toward the support member, and the member can connect with a part of a second surface of the support member and a part of the substrate, so that there is no contact between the substrate and the support member. In addition, the shape of the posts 104 that serve as spacer members is not limited to columns, and the spacer member may be formed in the shape of a frame, grid, or the like.

The support member 210 has a mounting part 210A whereby the infrared detection element 220 is mounted and supported, and two arms 210B that are linked to the mounting part 210A. The free ends of the two arms 210B are linked to the posts 104. The two arms 210B are thin and long and have extra length in order to thermally isolate the infrared detection element 220.

FIG. 2 shows a first wiring layer 214 and a second wiring layer 217 that are disposed on the support member 210. The first and second wiring layers 214, 217 extend along the arms 210B and connect to the circuit in the substrate 100 via the posts 104. The first and second wiring layers 214, 217 also are thin and long and have extra length in order to thermally isolate the infrared detection element 220.

2. SUMMARY OF PYROELECTRIC INFRARED DETECTOR

FIG. 1 is a sectional view of the pyroelectric infrared detector 200 shown in FIG. 2. With the pyroelectric infrared detector 200, the cavity 102 in FIG. 1 is embedded in a sacrificial layer (not shown) during the production process. This sacrificial layer is present from prior to the step for forming the support member 210 and the pyroelectric infrared detection element 220 to after this step. The layer is removed by isotropic etching subsequent to the step for forming the pyroelectric infrared detection element 220.

As shown in FIG. 1, the substrate 100 comprises a silicon substrate 110 and an insulating layer (e.g., $SiO_2$) 120 that is on the silicon substrate 110. The posts 104 are formed by etching the insulating layer 120 and are formed of $SiO_2$, for example. The posts 104 and the wiring structure in the insulating layer 120, as shown in FIG. 1, are configured using a plurality of metal layers L1A to L1C and a plurality of plugs CNT, HLA, HLB, and HLC that connect thereto. This wiring is connected to a detection circuit that is formed on a MOS transistor structure in the silicon substrate 110 shown in FIG. 1. The detection circuit can comprise a row selection circuit (row driver) and a read circuit that reads the data from the detectors via the columns (described in reference to FIG. 16A below). The cavity 102 is formed simultaneous to the posts 104 by etching the insulating layer 120. The opening 102A shown in FIG. 2 is formed by pattern-etching the support member 210.

The infrared detection element 220 that is mounted on a first surface 211A of the support member 210 includes a capacitor 230. The capacitor 230 comprises a pyroelectric body 232, a first electrode (lower electrode) 234 that is connected to the lower surface of the pyroelectric body 232, and a second electrode (upper electrode) 236 that is connected to the upper surface of the pyroelectric body 232. The first electrode 234 may also comprise a binding layer (not shown) that increases binding with the support member 210.

2.1. First Reducing Gas Barrier Layer

The capacitor 230 is covered by a first reducing gas barrier layer 240 that inhibits ingress of reducing gas (e.g., hydrogen, water vapor, OH groups, methyl groups) into the capacitor 230 in the steps after the formation of the capacitor 230. This is done because the pyroelectric body 232 (e.g., PZT) of the capacitor 230 is an oxide, and its oxygen is depleted when the oxide is reduced, leading to loss of the pyroelectric effect.

The first reducing gas barrier layer 240 can comprise a lower first barrier layer and an upper second barrier layer. The first barrier layer can be formed by film growth involving, for example, the sputtering of aluminum oxide, $Al_2O_3$. Because reducing gas is not used in sputtering, reduction of the capacitor 230 will not occur. The second hydrogen barrier layer can be formed by film growth involving, for example, atomic layer chemical vapor deposition (ALCVD) using aluminum oxide, $Al_2O_3$. Reducing gas is used in ordinary CVD (chemical vapor deposition), but the capacitor 230 is isolated from the reducing gas by the first barrier layer.

The total layer thickness of the first reducing gas barrier layer 240 is 50 to 70 nm, e.g., 60 nm. At this time, the first barrier layer that is formed by CVD is thicker than the second barrier layer that is formed by atomic layer chemical vapor deposition (ALCVD), which is thinner, at 35 to 65 nm, e.g., 40 nm. In contrast, the second barrier layer that is formed by atomic layer chemical vapor deposition (ALCVD) can be thin and may be formed by film growth of, for example, aluminum oxide, $Al_2O_3$, at 5 to 30 nm, e.g., 20 nm. Atomic layer chemical vapor deposition (ALCVD) has superior embedding characteristics in comparison to sputtering or the like. The method thus can be utilized for the production of fine detail, and the reducing gas barrier properties can be enhanced by the first and second barrier layers. Moreover, the first barrier layer that is grown by a sputtering method is not as dense as the second barrier layer, which has the effect of decreasing thermal transfer, thereby preventing dissipation of heat from the capacitor 230.

An interlayer insulating layer (insulating layer) 250 is formed on the first reducing gas barrier layer 240. In general, when raw material gas (TEOS) for the interlayer insulating layer 250 undergoes a chemical reaction, reducing gasses such as hydrogen gas or water vapor are generated. The first reducing gas barrier layer 240 that is provided at the periphery of the capacitor 230 protects the capacitor 230 from reducing gas that is generated during formation of the interlayer insulating layer 250.

A second electrode (upper electrode) wiring layer 224 is disposed on the interlayer insulating layer 250. In other words, the interlayer insulating layer 250 insulates the second electrode wiring layer 224 from the first and second electrodes 234, 236 in the capacitor 230. The interlayer insulating layer 250 functions as an electrically insulating body, whereas the pyroelectric body 232 functions as a dielectric body. A hole 252 (second opening) and a hole 254 are formed in the interlayer insulating layer 250 prior to formation of the electrode wiring. At this time, a contact hole (first opening) is similarly formed in the first reducing gas barrier layer 240. The second electrode (upper electrode) 236 and the second electrode wiring layer 224 are made to be in continuity by a plug 226 that is embedded in the hole 252 and the contact hole of the first reducing gas barrier layer 240.

A mediating conductive layer 238 that connects with the second electrode wiring layer 224 may be present on the first surface 211A of the support member 210. Due to a plug 228 that is embedded in the hole 254, continuity is produced between the second electrode (upper electrode) 236 and the mediating conductive layer 238. The mediating conductive layer 238 may be formed in the same structure as the first electrode 234 and in the same process as the first electrode 234.

If an interlayer insulating layer 250 is not present, then when a first electrode (lower electrode) wiring layer 222 and the second electrode (upper electrode) wiring layer 224 are pattern-etched, a second barrier layer 244 of the first reducing gas barrier layer 240 therebelow will be etched, and the barrier properties will decrease. The interlayer insulating layer 250 is necessary in order to ensure the barrier properties of the first reducing gas barrier layer 240.

The interlayer insulating layer 250 preferably has a low hydrogen content. The interlayer insulating layer 250 is subjected to a degassing treatment by annealing. In this manner, the hydrogen content of the interlayer insulating layer 250 is made to be lower than in a passivation layer 270 that covers the second electrode wiring layer 224.

2.2. Second Reducing Gas Barrier Layer

The first reducing gas barrier layer 240 of the top surface of the capacitor 230 is closed and does not have a hole (a first opening) during formation of the interlayer insulating layer 250, and thus reducing gas does not enter into the capacitor 230 during formation of the interlayer insulating layer 250. However, after formation of a hole (a first opening) in the first reducing gas barrier layer 240, the barrier properties deteriorate. A preferred example whereby this is prevented may involve adding a second reducing gas barrier layer 260 that encompasses the first reducing gas barrier layer 240. The second reducing gas barrier layer 260 makes up for the degradation of barrier properties due to the deficiency in the first reducing gas barrier layer 240 resulting from the formation of the hole (second opening) 252. It is thus desirable for the second reducing gas barrier layer 260 to be formed so that it covers at least the plug 226 that fills the hole 252, but the layer may also be formed so as to cover the first reducing gas barrier layer 240 in order to inhibit reducing gas wraparound.

The second reducing gas barrier layer 260 is formed on the second electrode wiring layer 224, and it is thus necessary to provide a thin film in order to inhibit the transfer of heat and release of heat. In addition, because the interlayer insulating layer 250 has infrared absorption effects, it is preferable to facilitate the passage of infrared light (wavelength range 8 to 14 μm) by producing the second reducing gas barrier layer 260 as a thin film.

To this end, in this embodiment, the second reducing gas barrier layer 260 is formed from aluminum oxide $Al_2O_3$ and is produced as a film that is thinner than the first reducing gas barrier layer 240. To this end, the second reducing gas barrier layer 260 is formed by e.g., atomic layer chemical vapor deposition (ALCVD), which allows the layer thickness to be adjusted at the level of the size of atoms. The layer thickness of the second reducing gas barrier layer 260 is 20 nm, for example. As described above, atomic layer chemical vapor deposition (ALCVD) has superior embedding characteristics in comparison to sputtering and the like, and this method thus allows the production of fine detail and the formation of a dense layer at the atomic level. The reducing gas barrier properties can thus be increased, even when a thin film is used. With normal CVD methods, a thick layer is produced, and infrared light transmittance is thus compromised. A silicon nitride $Si_3N_4$ film is undesirable for the second reducing gas barrier layer 260, because it must be formed as a thick layer of 100 nm or greater, for example, in order to ensure reducing gas barrier properties.

An $SiO_2$ or SiN passivation layer 270 is provided which covers the second electrode wiring layer 224. An infrared absorbing body (more broadly, a light-absorbing member) 280 is provided on the passivation layer 270 above the capacitor 230. The passivation layer 270 is also formed from $SiO_2$ or SiN, but is preferably a different material that has higher etching selectivity relative to the lower passivation layer 270, due to the need for pattern etching the infrared absorbing body 280. Infrared light is incident from the direction of the arrow in FIG. 1 on the infrared absorbing body 280, and the infrared absorbing body 280 generates heat in accordance with the amount of absorbed infrared light. Because this heat is conducted to the pyroelectric body 232, the spontaneous polarization level of the capacitor 230 changes due to the heat, and infrared light can be detected by detecting the charge that is produced by spontaneous polarization. The infrared absorbing body 280 is not restricted to being provided separately with respect to the capacitor 230; if present in the capacitor 230, a separate infrared absorbing body 280 need not be provided.

Although reducing gas is generated during CVD formation of the passivation layer 270 or the infrared absorbing body 280, the capacitor 230 is protected by the first reducing gas barrier layer 240 and the second reducing gas barrier layer 260.

2.3. Third Reducing Gas Barrier Layer

A third reducing gas barrier layer 290 is provided covering the outer surface of the infrared detector 200, including the infrared absorbing body 280. This third reducing gas barrier layer 290 must be formed thinner than, for example, the first reducing gas barrier layer 240 in order to increase the transmittance of infrared light (wavelength range 8 to 14 μm) that is incident on the infrared absorbing body 280. To this end, atomic layer chemical vapor deposition (ALCVD) is utilized. However, because the third reducing gas barrier layer 290 functions as an etching stop layer as described below, it is formed thicker than the second reducing gas barrier layer 260. In this embodiment, for example, aluminum oxide $Al_2O_3$ is formed by film growth at a thickness of 40 to 50 nm, e.g., 45 nm.

In addition, an etching stop layer 130 is used during isotropic etching of a sacrificial layer (not shown) that is embedded in the cavity 102 during the process for producing the pyroelectric infrared detector 200. This etching stop layer 130 is formed on the wall part that defines the cavity 102 towards the substrate 100, specifically, the side wall 104A and the bottom wall 110A that define the cavity 102. Similarly, an etching stop layer 140 is formed on the lower surface of the support member 210 as well. In this embodiment, the third reducing gas barrier layer 290 is formed from the same material as the etching stop layers 130, 140. In other words, the etching stop layers 130, 140 also have reducing gas barrier properties. The etching stop layers 130, 140 are formed by forming an aluminum oxide $Al_2O_3$ film at a layer thickness of 20 to 50 nm by atomic layer chemical vapor deposition (ALCVD).

Because the etching stop layer 130 has reducing gas barrier properties, when isotropic etching of the sacrificial layer is carried out using fluoric acid in a reducing atmosphere, passage of reducing gas through the support member 210 and ingress into the capacitor 230 can be inhibited. In addition, because the etching stop layer 140 that covers the substrate 100 has reducing gas barrier properties, reduction and degradation of the wiring or transistors of the circuits that are disposed in the substrate 100 can be inhibited.

3. BASIC STRUCTURE OF SUPPORT MEMBER

As shown in FIG. 1, a post 104, a support member 210, and a pyroelectric infrared detection element 220 are layered on the substrate 100 sequentially from the bottom layer to the top layer. The pyroelectric infrared detection element 220 is mounted on the support member 210 on the first surface 211A, and the second surface 211B faces the cavity 102.

The support member 210, as shown in FIG. 1, uses a first layer member 212 on the first surface as an $SiO_2$ support layer (insulating layer). This $SiO_2$ support layer 212 has a lower hydrogen content than, for example, the post 104 which is another $SiO_2$ layer that is situated below the $SiO_2$ support layer 212. This is achieved by decreasing the hydrogen or water content in the layer by increasing the $O_2$ flow rate during CVD layer film growth relative to common CVD methods for forming interlayer insulating layers. As a result, the $SiO_2$ support layer 212 will be a low-hydrogen layer that has a hydrogen content that is lower than, for example, the post 104 which is another $SiO_2$ layer (second insulating layer).

When the hydrogen content of the $SiO_2$ support layer 212 on the top-most layer of the support member 210 is low, the generation of reducing gas (hydrogen, water vapor) from the $SiO_2$ support layer 212 itself can be inhibited, even when exposed to high temperatures during heat treatment subsequent to the formation of the pyroelectric body 232. In this manner, it is possible to inhibit reducing species that enter the pyroelectric body 232 in the capacitor 230 from directly below the capacitor 230 (from the side of the support member 210), and it is possible to minimize the incidence of oxygen deficiency in the pyroelectric body 232.

Although the water content of, for example, the post 104 which is another $SiO_2$ layer that is disposed below the $SiO_2$ support layer 212 can also act as a reducing species, because it is isolated from the capacitor 230, its degree of influence is smaller than that of the $SiO_2$ support layer 212. However, because the water content of the post 104 can also act as a reducing species, it is preferable to form a layer having reducing gas barrier properties in the support member 210 that is disposed below the $SiO_2$ support layer 212. A detailed structure of a support member 210 that includes this feature is described below.

In other words, in this embodiment, the support member 210 can warp when formed from a single material, and is produced by layering a plurality of different materials. Specifically, the member can be formed from a first layer member 212 having the form of an oxide layer ($SiO_2$) and a second layer member 213 having the form of a nitride layer (e.g., $Si_3N_4$).

For example, residual contraction stress arising in the first layer member 212 and residual tensile stress arising in the second layer member 213 act in directions whereby they cancel each other out. As a result, it is possible to additionally decrease or eliminate residual stress in the support member 210 as a whole.

Here, the nitride layer (e.g., $Si_3N_4$) that forms the second layer member 213 has reducing gas barrier properties. It is thereby possible for the support member 210 to be imparted with a function for blocking reduction-impairing elements infiltrating the pyroelectric body 232 of the capacitor 230 from the support member 210. For this reason, even with $SiO_2$ layers having high hydrogen content that are preset below the second layer member 213, ingress of reducing species (hydrogen, water vapor) into the pyroelectric body 232 can be inhibited by the second layer member 213 having reducing gas barrier properties.

4. WIRING STRUCTURE FOR SUPPORT MEMBER

4.1. Wiring Structure of First Electrode

Lower Electrode

In this embodiment, as shown in FIG. 1, the first electrode 234 comprises a first region 234-1 in which the pyroelectric body 232 is formed by layering and a second region 234-2 that is formed so as to extend from the first region 234-1.

The support member 210 comprises a first wiring layer 214 that is disposed more towards the second surface 211B than the first layer member 212 which is the insulating layer, a first hole 215 that is formed so as to pass through to the first layer member 212 in a position that is opposite the second region 234-2 of the first electrode 234 and the first wiring layer 214, and a first plug 216 that is embedded in the first hole 215.

In accordance with this embodiment, the wiring that connects to the first electrode 234 can be formed by the first wiring layer 214 and the first plug 216 that are formed in the support member 210. The first plug 216 is formed in the support member 210 at a position that is not opposite the capacitor 230 and thus has no influence on planarity or the like of the portion of the support member 210 that is opposite the capacitor 230. The orientation of the capacitor 230 is thus maintained, as described below.

In addition, the first hole 215 is shallow and has a small aspect ratio, and there is not an extremely strong demand in regard to planarity of the first plug 216 in the second region 234-2. As a result, it is not necessary for the first plug 216 to be formed using a costly material having high step coverage (step filmability) such as tungsten (W).

In addition, because the wiring layer that connects to the first electrode 234 leads to the support member 20 via the first plug 216, steps are not formed with the pyroelectric detection element 220 or the support member 210 due to the wiring that leads to the first electrode 234 (refer to FIG. 1). By preserving the planarity of the support member 210, the precision with which the resist is formed during formation of the support member 210 in the production process is increased, and the shape processability of the support member 210 is improved.

Figure 3:
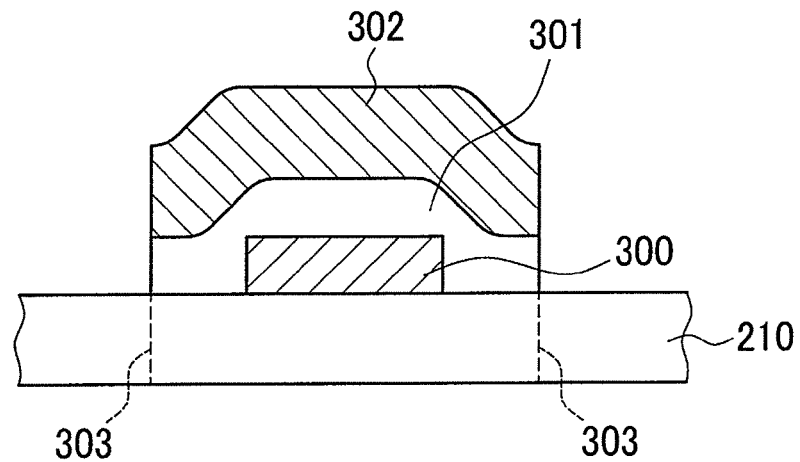
FIG. 3 is a diagram showing a comparative example of a support member having a step.

FIG. 3 shows the etching step of a comparative example. A wiring layer 300 is formed on the support member 210, and a passivation layer 301 is then formed on the wiring layer 300. Due to the presence of the wiring layer 300, a step is produced, and the passivation layer 301 is not planar. Thus, the precision with which the resist 302 is formed on the passivation layer 301 is compromised. As a result, there are cases where the support member 210 cannot be etched at an original profile position 303 using the resist 302 of this type, and shape processing of the support member 210 is compromised. In this embodiment, the planarity of the support member 210 is maintained, and so the shape processability of the support member 210 is favorable.

4.2. Wiring Structure Leading to Second Electrode

Upper Electrode

In this embodiment, as described above, a mediating conductive layer 238 that connects to the second electrode 236 can be provided on the first surface 211A of the support member 210. In this case, the support member 210 can also comprise a second wiring layer 217 that is disposed more towards the second surface 211B from than the first layer member (insulating layer) 212, a second hole 218 that is formed so as to pass through to the first layer member (insulating layer) 212 at a position that is opposite the second wiring layer 217 and the mediating conductive layer 238, and a second plug 219 that is embedded in the second hole 218.

In this case as well, the wiring that connects to the second electrode 236 leads to the support member 210 via the second plug 219, and thus the support member 210 is not formed with a step due to the wiring that leads to the second electrode 236 (refer to FIG. 1). By preserving the planarity of the support member 210, the resist that is formed on the support member 210 in the production process is formed with high precision, and shape processing of the support member 210 is improved, as described above.

5. RELATIONSHIP BETWEEN CAPACITOR STRUCTURE AND WIRING

Figure 4:
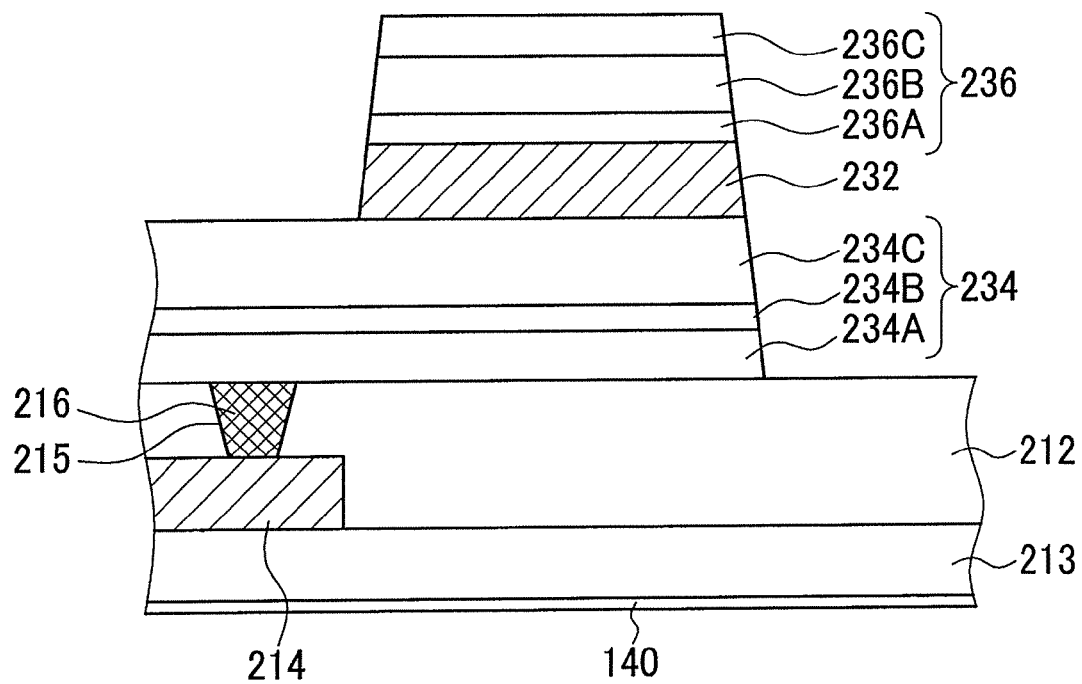
FIG. 4 is an enlarged view of the support member and a capacitor of a pyroelectric infrared detection device according to an embodiment of the present invention.

Next, the structure of the capacitor 230 of this embodiment will be described with reference to FIG. 4. With the capacitor 230 shown in FIG. 4, the crystal orientations of the pyroelectric body 232, the first electrode 234, and the second electrode 236 are aligned so that the preferential orientation system is the (111) plane system. Because preferential orientation occurs in the (111) plane system, the ratio of orientation in the (111) orientation is controlled at, for example, 90% or greater relative to other plane systems. In order to increase the pyroelectric constant, the (100) orientation is more preferable than the (111) orientation, but the (111) orientation is used in order to facilitate control of polarization with respect to the direction of the applied electric field. However, the preferential orientation system is not restricted to this orientation system.

5.1. Relationship Between First Electrode Structure and Wiring

The first electrode 234 can comprise, sequentially from the support member 210, an orientation control layer (e.g., Ir) 234A that controls orientation so that the first electrode 234 is preferentially oriented in the (111) plane, a first reducing gas barrier layer (e.g., $IrO_x$) 234B, and a preferably oriented seed layer (e.g., Pt) 234C.

The second electrode 236 can comprise, in sequence from the pyroelectric body 232, an orientation matching layer (e.g., Pt) 236A that matches the crystal orientation of the pyroelectric body 232, a second reducing gas barrier layer (e.g., $IrO_x$) 236B, and a resistance reduction layer (e.g., Ir) 236C that reduces the resistance of the junction with the plug 228 that connects to the second electrode 236.

The first and second electrodes 234, 236 of the capacitor 230 are given a multilayered structure in this embodiment so that, despite the infrared detection element 220 having low heat capacity, processing will be performed with minimal damage and the crystal lattice level at the interface will be matched with little impact on performance; and, moreover, the pyroelectric body (oxide) 232 will be isolated from the reducing gas even if a reducing atmosphere forms around the capacitor 230 during manufacture or use.

The pyroelectric body 232 is formed by crystal growth of PZT ($Pb(Zr, Ti)O_3$, generic name: lead zirconate titanate) or PZTN (generic name for material in which Nb is added to PZT), preferentially oriented according to the (111) system, for example. Using PZTN is preferred in terms of minimizing oxidative damage and lessening the likelihood of reduction, even in a thin film. In order to bring about crystal orientation in the pyroelectric body 232, the crystals of the first electrode 234 in the lower layer of the pyroelectric body 232 are oriented from the stage at which the first electrode 234 is formed.

To this end, an Ir layer 234A that functions as an orientation control layer is formed by sputtering on the lower electrode 234. It is desirable to form a titanium aluminum nitride (TiAlN) layer or a titanium nitride (TiN) layer as a binding layer under the orientation control layer 234A. This is because binding with the $SiO_2$ of the $SiO_2$ support layer (first insulating layer) 212 used as the topmost layer of the support member 210 can thereby be ensured. Although titanium (Ti) is also suitable as this type of binding layer, titanium (Ti) is undesirable because it is highly dispersible, and thus titanium aluminum nitride (TiAlN) or titanium nitride (TiN) which have high reducing gas barrier properties and little dispersibility are preferred.

In addition, when the first layer member 212 of the support member 210 is formed from $SiO_2$, the $SiO_2$ layer preferably has a surface roughness Ra of less than 30 nm on the side of the $SiO_2$ layer that is in contact with the first electrode 234. When this is done, planarity of the surface of the first layer member 212 on which the capacitor 230 is mounted can be ensured. It is undesirable for the surface on which the orientation control layer 234A is formed to be rough because the orientation of the crystals will be disrupted during crystal growth by the unevenness of the rough surface.

In this embodiment, the first plug 216 is in a position that is not opposite the first region 234-1 in which the capacitor 230 is formed, and the first layer member 212 therefore has no influence on the planarity of the surface on which the capacitor 230 is mounted. Thus, the orientation of the capacitor 230 is maintained.

The thermal conductivity of the constituent material of the first wiring layer 214 in the region of contact with the first plug 216 provided to the support member 210 can be lower than the thermal conductivity of the constituent material of the first electrode 234 in the region of contact with the first plug 216. For example, the first wiring layer 214 may have a lower layer that is titanium (Ti) and an upper layer that is titanium nitride (TiN).

When this is done, the thermal conductivity of the titanium nitride (TiN) which is the constituent material of the first wiring layer 214 in the region of contact with the first plug 216 provided to the support member 210 can be lower than the thermal conductivity of the iridium (Ir) which is the constituent material of the first electrode 234 in the region of contact with the first plug 216. This is due to the fact that the thermal conductivity of titanium (Ti) is 21.9 (W/m·K), which is substantially less than the thermal conductivity of 147 (W/m·K) for iridium (Ir), and the thermal conductivity of the titanium nitride (TiN) is additionally decreased depending on the mixing ratio of nitrogen and titanium.

When the constituent material of the first electrode 234 in the region of contact with the first plug 216 is a binding layer, e.g., titanium aluminum nitride (TiAlN), it is desirable to adjust the mixing ratio of nitrogen and titanium so that the thermal conductivity of the titanium nitride (TiN) which is the constituent material of the first wiring layer 214 in the region of contact with the first plug 216 is lower than the thermal conductivity of the titanium aluminum nitride (TiAlN).

The $IrO_x$ layer 234B that functions as a reducing gas barrier layer in the first electrode 234 is used in conjunction with the second layer member (e.g., $Si_3N_4$) 213 of the support member 210 that manifests reducing gas barrier properties and the etching stop layer (e.g., $Al_2O_3$) 140 of the support member 210 in order to isolate the pyroelectric body 232 from reducing impediment factors that enter from below the capacitor 230. For example, gas that is released from the substrate 100 during firing of the pyroelectric body (ceramic) 232 and other annealing steps, and reducing gas that is used in the isotropic etching step for the sacrificial layer 150 function as reducing impediment factors.

During the firing step for the pyroelectric body 232, evaporated gas is generated in some cases inside the capacitor 230 during high-temperature treatment, but an escape route for this evaporated gas is ensured by the first layer member 212 of the support member 210. In other words, in order for the evaporated gas that is generated inside the capacitor 230 to escape, it is desirable to provide gas barrier properties in the second layer member 213 and to not provide gas barrier properties in the first layer member 212.

In addition, the $IrO_x$ layer 234B itself has little crystallinity, but has favorable compatibility with the Ir layer 234A due to the metal-metal oxide relationship, and the layer thus can have the same preferred orientation system as the Ir layer 234A.

The Pt layer 234C that functions as a seed layer in the first electrode 234 has a (111) orientation and serves as a seed layer for preferential orientation of the pyroelectric body 232. In this embodiment, the Pt layer 234C is formed with a double-layer structure. The first Pt layer serves as a foundation for the (111) orientation, and the second Pt layer provides micro-roughness at the surface and functions as a seed layer for preferential orientation of the pyroelectric body 232. The pyroelectric body 232 is thus made to have a (111) orientation in alignment with the seed layer 234C.

The first electrode 234 has a metal oxide layer 234B between the two metal layers 234A, 234C. For this reason, the amount of heat that is released from the first electrode 234 to the first plug 216 and the first wiring layer 214 can be reduced due to the metal oxide layer 234B that has lower thermal conductivity than the metal layers 234A, 234C. It is thus possible to ensure thermal isolation of the pyroelectric detection element 220.

5.2. Second Electrode Structure

With the second electrode 236, if filming is carried out using a sputtering method, then the interface will be physically rough, and there is the danger that characteristics will deteriorate as a result of the generation of trap sites. Consequently, reconstruction of crystal-level lattice matching is carried out in order to produce a continuous crystal orientation in the first electrode 234, the pyroelectric body 232, and the second electrode 236.

Although the Pt layer 236A of the second electrode 236 is formed by sputtering, the crystal orientation of the interface immediately after sputtering is not continuous. Thus, the Pt layer 236A is recrystallized by carrying out a subsequent annealing treatment. In other words, the Pt layer 236A functions as an orientation matching layer, and the crystal orientation is made to match that of the pyroelectric body 232.

The $IrO_x$ layer 236B in the second electrode 236 functions as a barrier to reducing impediment factors that enter from above the capacitor 230. In addition, the Ir layer 236C in the second electrode 236 has a higher resistance than the $IrO_x$ layer 236B, and so it is used in order to lower the resistance with respect to the plug 228. The Ir layer 236C has favorable compatibility with the $IrO_x$ layer 236B due to the metal oxide-metal relationship and has the same preferential orientation system as the $IrO_x$ layer 236B.

Thus, in this embodiment, the first and second electrodes 234, 236 are disposed in multiple layers of Pt, IrOx, and Ir in the stated order relative to the pyroelectric body 232, the forming materials being arranged symmetrically about the pyroelectric body 232.

However, the thicknesses of the respective layers of the multilayer structures that form the first and second electrodes 234, 236 are asymmetrical about the pyroelectric body 232.

6. MODIFICATION EXAMPLES

6.1. First Modification Example

Figure 5:
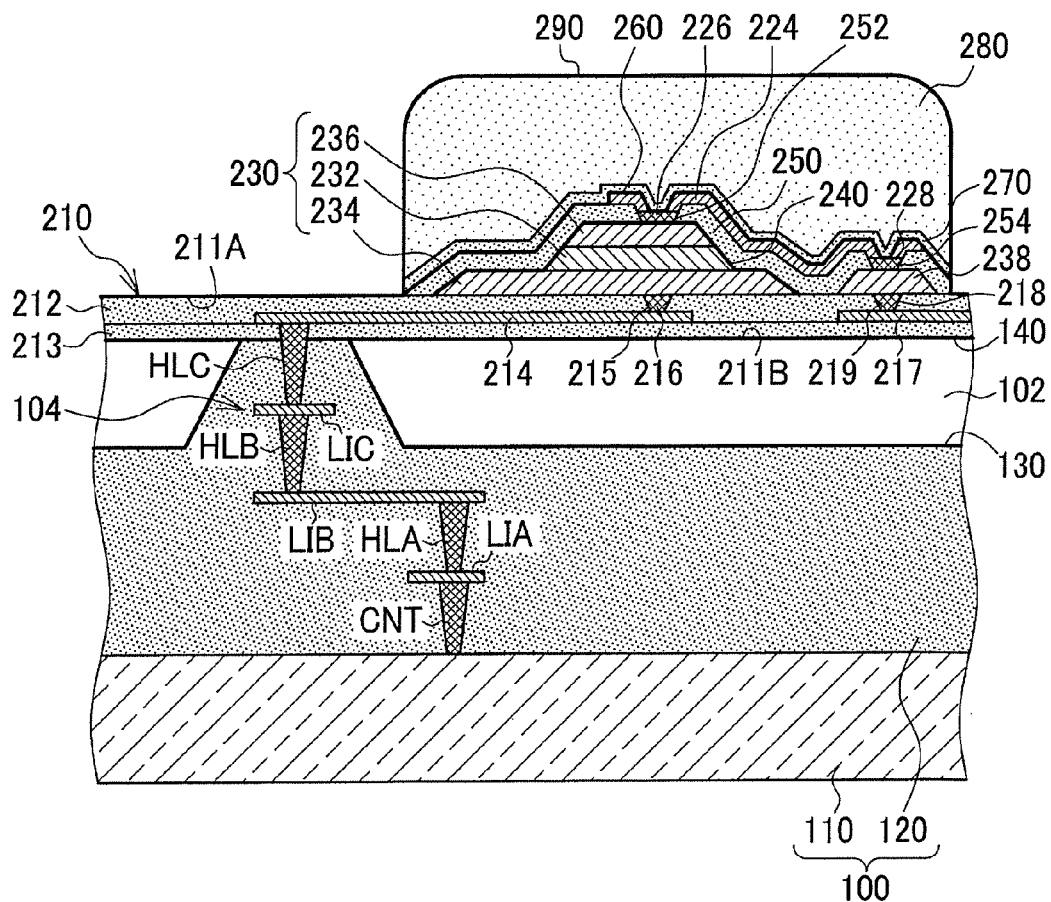
FIG. 5 is a conceptual sectional view of a pyroelectric detector for one cell in a pyroelectric infrared detection device according to another embodiment of the present invention.

In the embodiment of FIG. 5 as well, the first through third reducing gas barrier layers 240, 260, 290 are formed in the same manner as in FIG. 1. The difference relative to FIG. 1 is the position of the first hole 215 and the first plug 216.

As shown in FIG. 5, the first hole 215 is positioned facing the first electrode 234 and the first wiring layer 214 and may be formed so as to pass through the first layer member 212 at a position opposite the capacitor 230. The first plug 216 is embedded in the first hole 215 that is formed at a position that is opposite the capacitor 230.

In FIG. 5, a material such as tungsten (W) having high step coverage (step filmability) is preferably used for the first plug 216 The first surface 211A of the support member 210 affects the orientation of the capacitor 230, and thus planarity is desired.

In this embodiment as well, the wiring that connects to the first electrode 234 can be formed by the first wiring layer 214 and the first plug 216 formed on the support member 210. The first plug 216 is formed on the support member 210 at a position that is opposite the capacitor 230, and thus the element surface area is not any larger than in FIG. 1 due to the wiring that connects to the first electrode 234. A pyroelectric detector thus can be offered that is suitable for producing high levels of integration.

6.2. Second Modification Example

Figure 6:
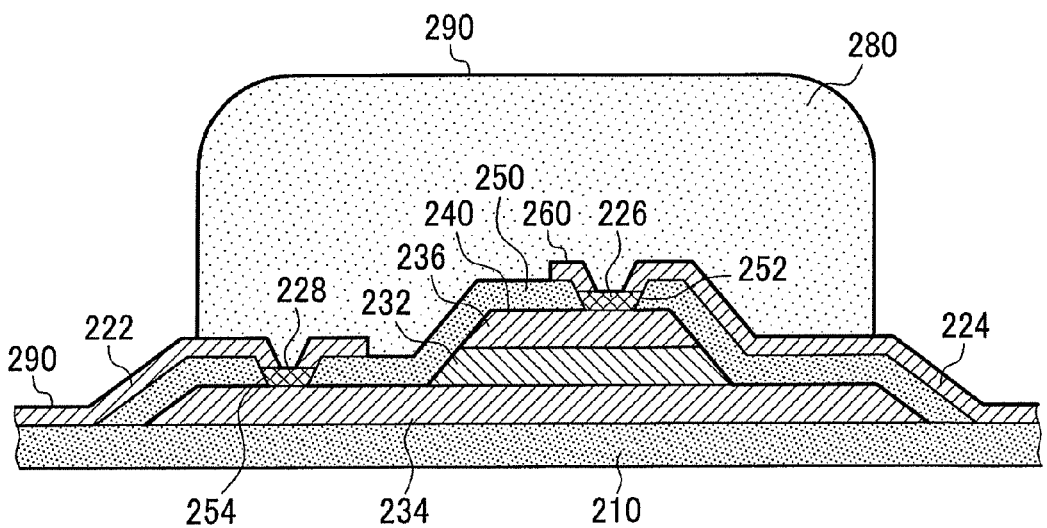
FIG. 6 is a conceptual sectional view of a pyroelectric detector for one cell in a pyroelectric infrared detection device according to yet another embodiment of the present invention.

As shown in FIG. 6, the present invention can be used in a configuration in which the wiring to the first and second electrodes 234, 236 leads to the upper layer of the support member 210. In FIG. 6 as well, the first through third reducing gas barrier layers 240, 260, 290 are formed in the same manner as in FIG. 1 and FIG. 5.

As in FIG. 1 and FIG. 5, the plug 226 is embedded in the hole 252 that is formed in the interlayer insulating layer 250, and the plug 226 connects with the second electrode wiring layer 224. However, the second electrode wiring layer 224 is positioned at the upper layer of the support member 210, in contrast to FIG. 1 and FIG. 5.

Moreover, in contrast to FIG. 1 and FIG. 5, the plug 228 is embedded in the hole 254 that is formed in the interlayer insulating layer 250, and the plug 228 connects with a first electrode wiring layer 222. The first electrode wiring layer 222 is positioned at the top layer of the support member 210, in contrast to FIG. 1 and FIG. 5.

In this embodiment, aspects related to the reducing gas barrier layers are similar to the other embodiments described above, but, as in the comparative example of FIG. 3, a configuration is produced in which a step is generated in the arm part 210B of the support member 210.

7. ELECTRONIC INSTRUMENT

7.1. Infrared Camera

Figure 7:
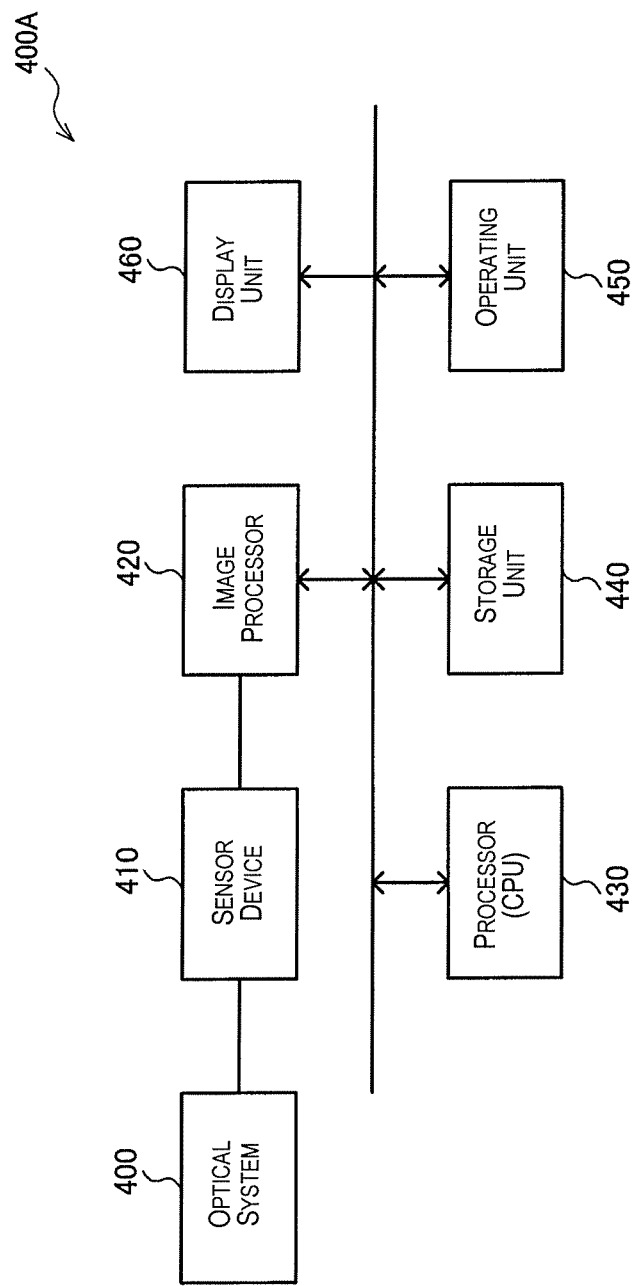
FIG. 7 is a block diagram of an infrared camera (electronic instrument) that has a pyroelectric detector or a pyroelectric detection device.

FIG. 7 shows a configuration example for an infrared camera 400A which is used as an example of an electronic instrument that comprises the pyroelectric detector or pyroelectric detection device of this embodiment. This infrared camera 400A comprises an optical system 400, a sensor device (pyroelectric detection device) 410, an image processor 420, a processing part 430, a storage unit 440, an operating unit 450, and a display unit 460. The infrared camera 400A of this embodiment is not restricted to the configuration of FIG. 7, and various modified embodiments are possible in which some of the constituent elements (e.g., the optical system, operational part, or display part) are omitted or other constituent elements are added.

The optical system 400 comprises, for example, one or a plurality of lenses and a drive part or the like that drives these lenses. Image capture of the image of an object is carried out by the sensor device 410, and focal adjustment is carried out as necessary.

The sensor device 410 has a configuration in which pyroelectric detectors 200 of the embodiments described above are arranged two-dimensionally, and a plurality of lines (scan lines or word lines) and a plurality of columns (data lines) are provided. The sensor device 410 can also comprise a row selection circuit (row driver), a read circuit for reading data from the detectors via the columns, an A/D conversion unit, and the like, in addition to the detectors that are arranged two-dimensionally. Because data is sequentially read from the detectors that are arranged two-dimensionally, a captured image of the object can be processed.

Based on the digital image data (pixel data) from the sensor device 410, the image processor 420 carries out various image processing operations such as image correction processing.

The processing part 430 carries out control of the respective elements of the infrared camera 400A and overall control of the infrared camera 400A. The processing part 430 is realized, for example, in a CPU or the like. The storage unit 440 stores various types of information, and, for example, functions as a work space for the processing part 430 or the image processor 420. The operating unit 450 is used as an interface for a user to operate the infrared camera 400A and can be realized, for example, in the form of various buttons, a graphical user interface (GUI) screen, or the like. The display unit 460 displays the GUI screen, images that have been captured by the sensor device 410, and the like, and is realized in the form of various types of displays, such as a liquid crystal display or organic EL display.

By using the pyroelectric detector of a single cell as a sensor such as an infrared sensor in this manner, and the sensor device 410 can be configured by disposing the pyroelectric detector of each cell two dimensionally along two axes, e.g., two perpendicular axes. When this is done, it is possible to capture thermal (light) distribution images. By using this sensor device 410, it is possible to configure an electronic instrument such as a thermographic device or an on-board automotive night-vision camera or surveillance camera.

As shall be apparent, using the pyroelectric detector of one cell or a plurality of cells as a sensor, it is possible to configure various types of electronic instruments, such as analytical instruments (measurement instruments) for analyzing (measuring) physical data related to an object, security instruments for detecting fire or heat, and factory automation (FA) instruments that are installed in factories and the like.

7.2. On-Board Assistance Device

Figure 8:
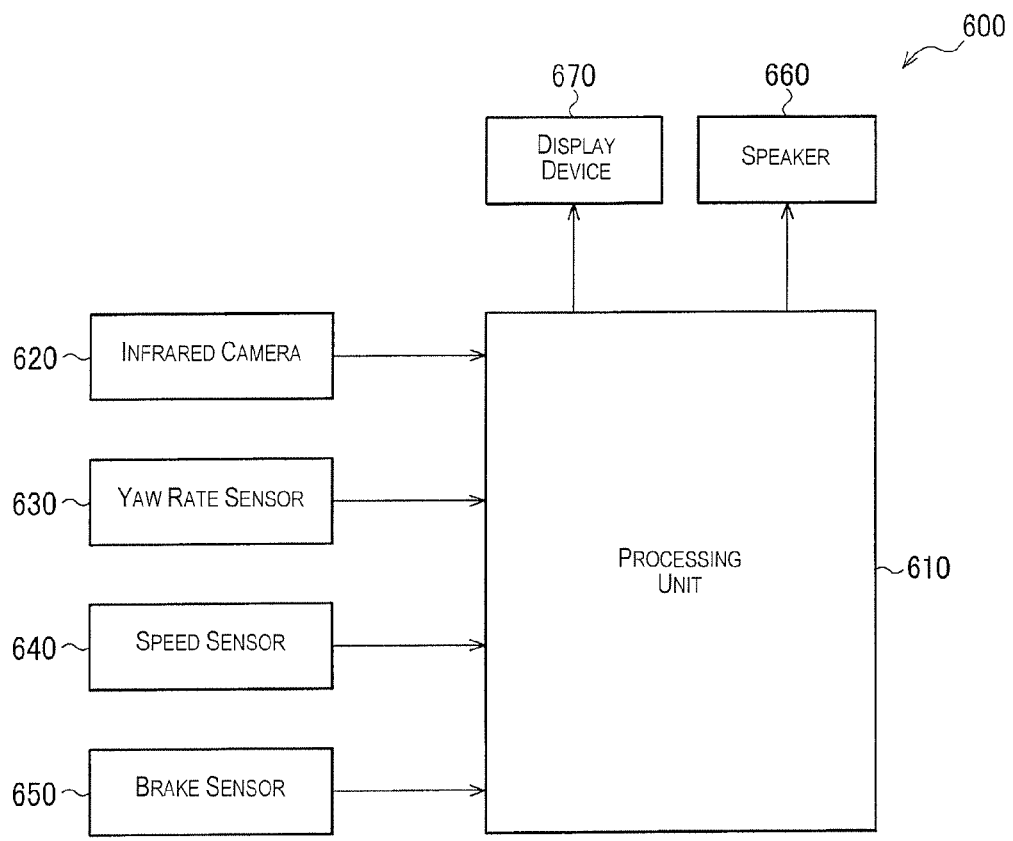
FIG. 8 is a diagram showing an on-board assistance device (electronic instrument) that has an infrared camera.

FIG. 8 shows a configuration example of an on-board assistance device 600 that is an example of an electronic instrument that comprises the pyroelectric detector or pyroelectric detection device of this embodiment. The on-board assistance device 600 has a configuration that comprises a processing unit 610 having a CPU that controls the on-board assistance device 600, an infrared camera 620 that allows detection of infrared light in a prescribed imaging region outside the automobile, a yaw rate sensor 630 that detects the automobile yaw rate, a speed sensor 640 that detects the travel speed of the automobile, a brake sensor 650 that detects operation of the brake by the driver, a speaker 660, and a display device 670.

The processing unit 610 of the on-board assistance device 600 detects an object such as a pedestrian or a body that is present in advance of the travel direction of the automobile from infrared images of the periphery of the automobile obtained by imaging using the infrared camera 620, and detection signals related to the state of travel of the automobile that are detected by the respective sensors 630 to 650. When it is determined that contact between the automobile and a detected object may occur, a warning is output by the speaker 660 or the display device 670.

Figure 9:
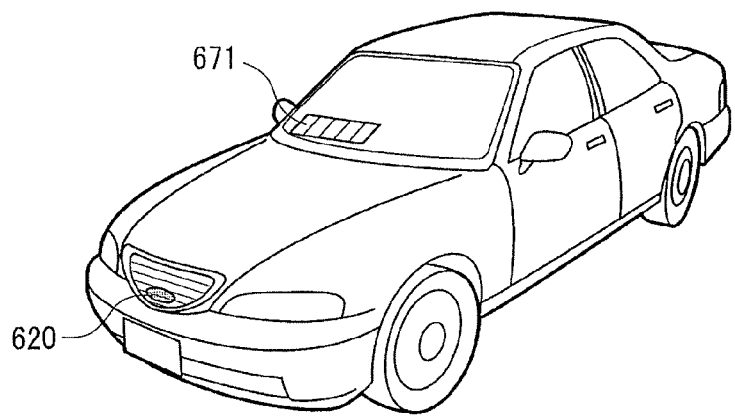
FIG. 9 is a diagram showing an automobile having the infrared camera shown in FIG. 7 mounted on its front.

For example, as shown in FIG. 9, the infrared camera 620 is disposed near the middle of the vehicle width direction along the front of the automobile. The display device 670 is configured by providing a heads-up display (HUD) 671 that displays various data in a position in the front window that does not obstruct the frontward field of view of the operator.

7.3. Security Instrument

Figure 10:
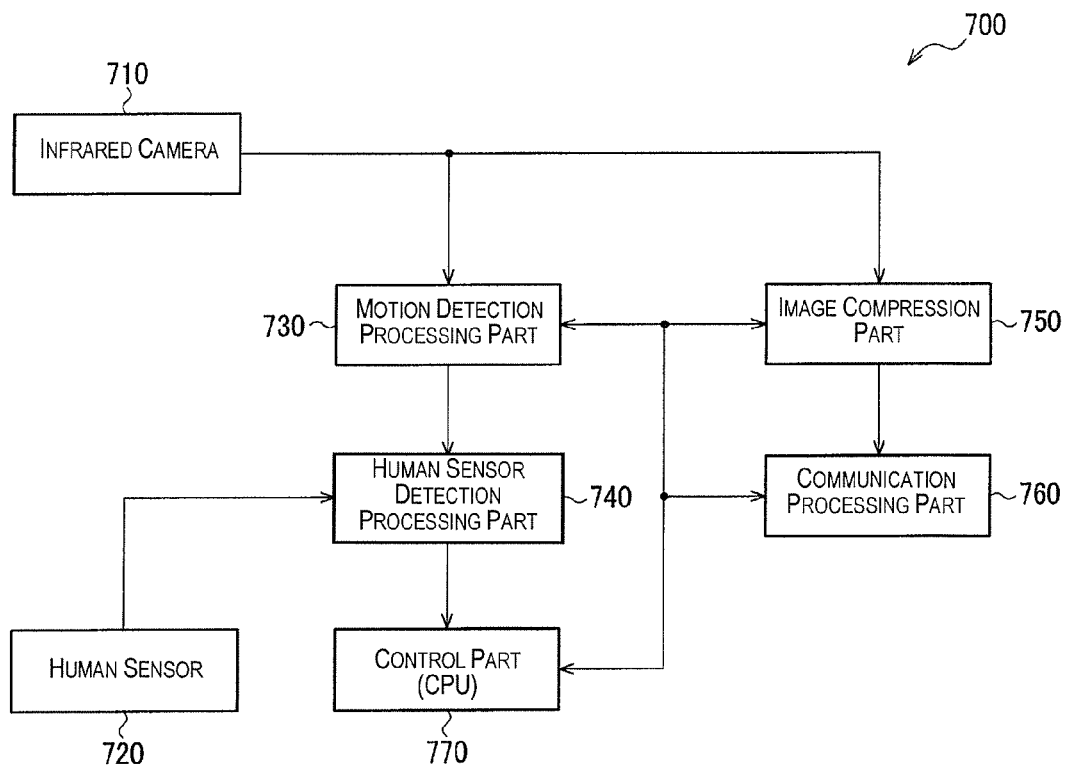
FIG. 10 is a diagram showing a security device (electronic instrument) that has an infrared camera.

FIG. 10 shows a configurational example of a security instrument 700 which is used as an example of an electronic instrument that comprises the pyroelectric detector or pyroelectric detection device of this embodiment.

The security instrument 700 comprises an infrared camera 710 that takes images of at least an area to be monitored, a human sensor 720 that detects intruders into the monitored area, a detection processing part 730 that acts to detect moving bodies that enter into the monitored area by processing image data that is output from the infrared camera 710, a human sensor detection processing part 740 that carries out detection processing for the human sensor 720, an image compression part 750 that compresses image data that has been output from the infrared camera 710 into a prescribed format, a communication processing part 760 that transmits compressed image data or intruder detection data and receives various types of setting information for the security instrument 700 from external devices, and a control part 770 that uses a CPU to carry out parameter setting, processing command transmission, and response processing with respect to various processing parts of the security instrument 700.

The motion detection processing part 730 has a buffer memory that is not shown in the drawings, a block data smoothing part whereby the output of the buffer memory is input, and a state modification detection part whereby the output of the block data smoothing part is input. The state modification detection part of the movement detection processing part 730 detects a change in state using the fact that the same image data will be present in different frames taken in movie mode if the monitored area is under static conditions, whereas a difference in image data between frames will arise when a change of state occurs (entry of a moving body).

Figure 11:
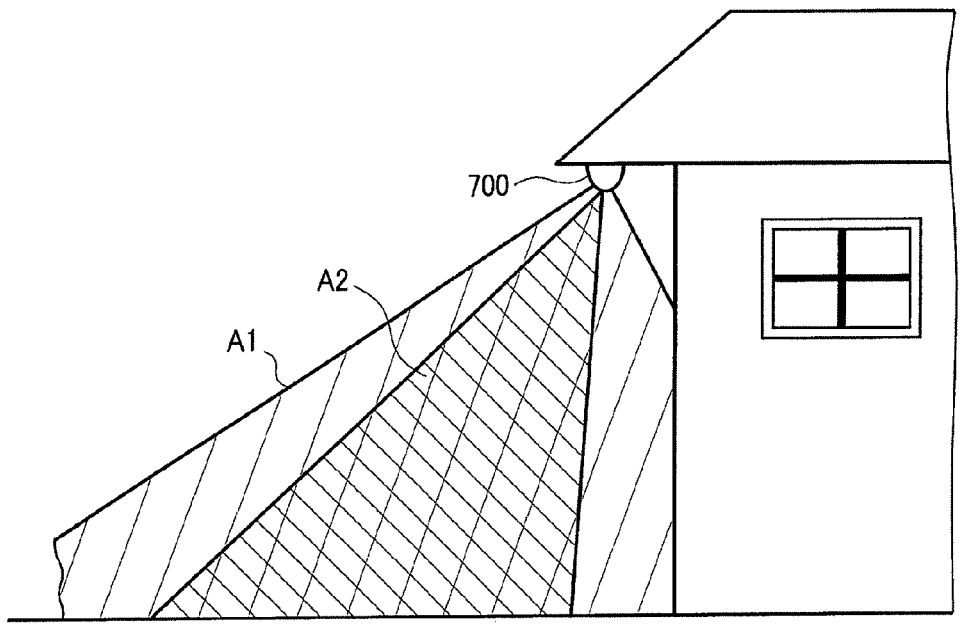
FIG. 11 is a diagram showing the detection area for a human sensor and an infrared camera in a security instrument shown in FIG. 10.

FIG. 11 is a side view of a security instrument 700 that is installed, e.g., under a roof overhang, an imaging area A1 of the infrared camera 710 that is contained in the security instrument 700, and a detection area A2 of the human sensor 720.

7.4. Gaming Device

Figure 12:
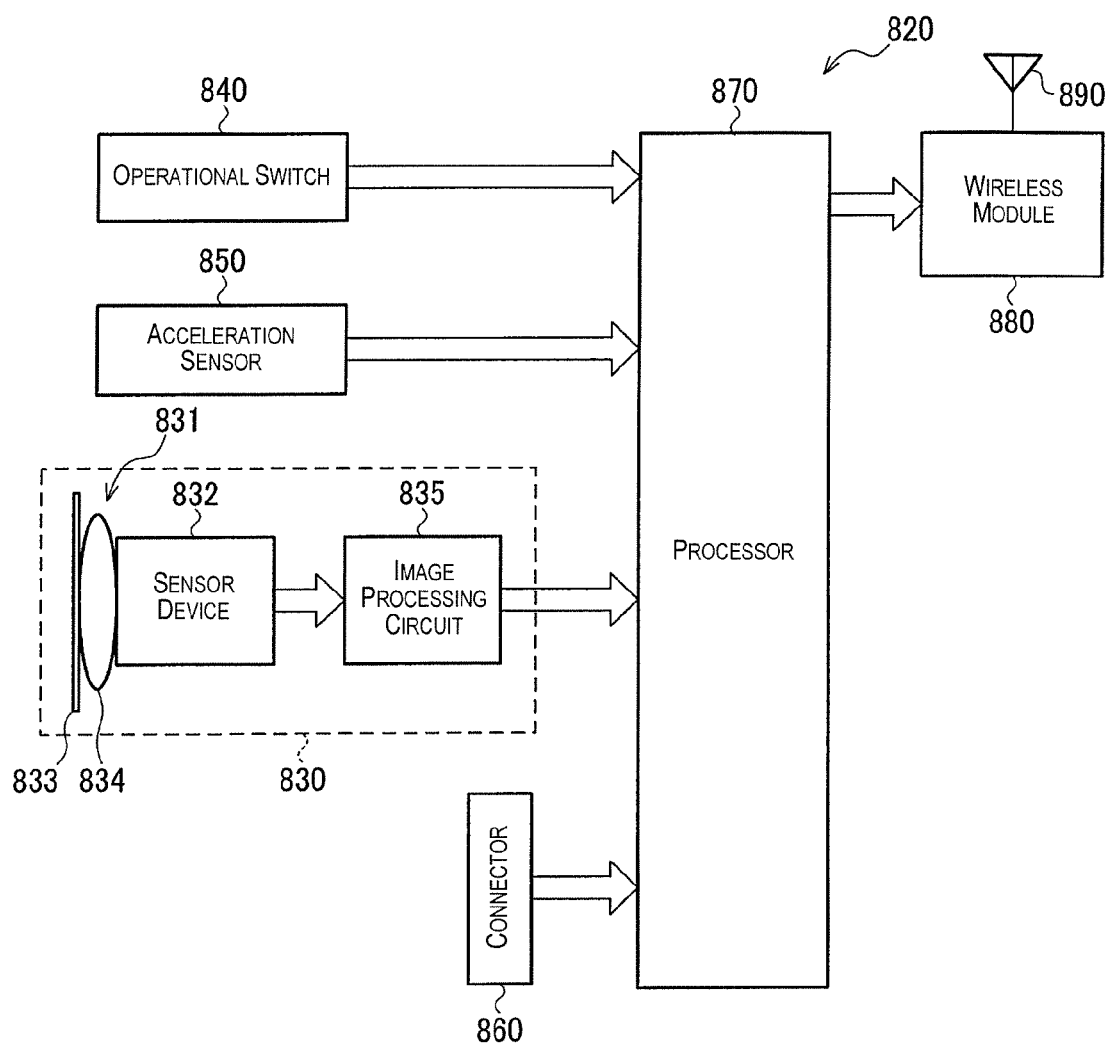
FIG. 12 is a diagram showing a controller that is used in a gaming device that has the sensor device shown in FIG. 7.
Figure 13:
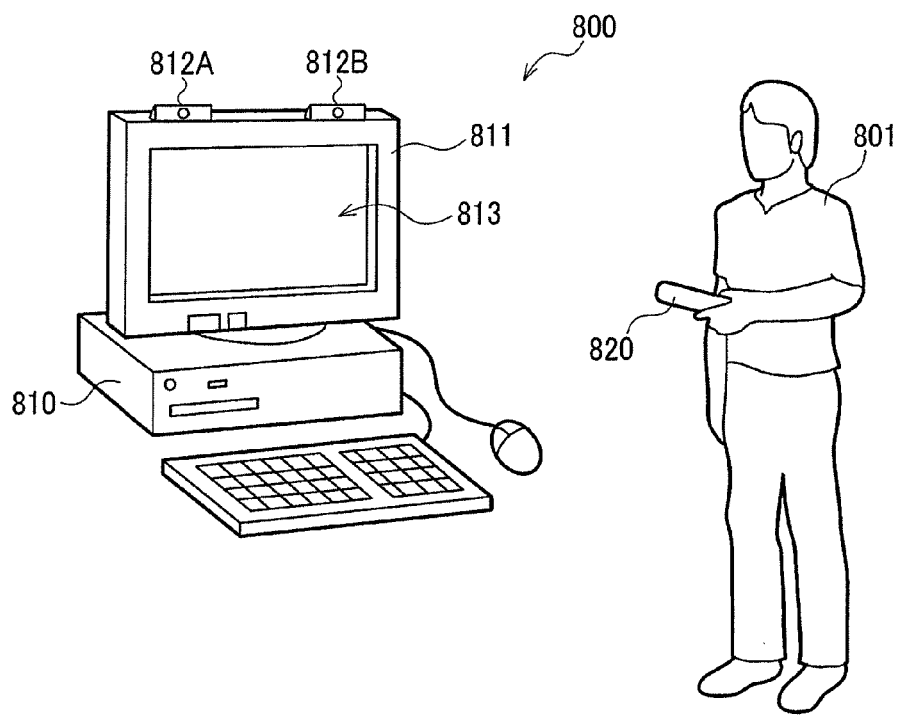
FIG. 13 is a diagram showing a gaming device comprising the controller shown in FIG. 12.

FIGS. 12 and 13 show an example of the configuration of a gaming device 800 that contains a controller 820 that utilizes the sensor device 410 described above, which is used as an example of an electronic instrument that contains the pyroelectric detector or pyroelectric detection device of this embodiment.

As shown in FIG. 12, the controller 820 that is used in the gaming device 800 of FIG. 13 has a configuration that comprises an image data computation unit 830, an operating switch 840, an acceleration sensor 850, a connector 860, a processor 870, and a wireless module 880.

The imaging data computation unit 830 has an image capture unit 831 and an image processing circuit 835 for processing the image data that has been captured by the image capture unit 831. The image capture unit 831 includes a sensor device 832 (sensor device 410 of FIG. 7), there being an infrared filter 833 (that admits only infrared light) and an optical system (lens) 834 disposed in front thereof. The image processing circuit 835 processes the infrared image data obtained from the image capture unit 831, detects high-brightness portions, detects the centers of gravity and the surface areas thereof, and then outputs these data.

The processor 870 outputs, as a series of control data, operational data obtained from the operating switch 840 and acceleration data obtained from the acceleration sensor 850, as well as high-brightness data. The wireless module 880 modulates a carrier signal of a prescribed frequency with the control data and outputs a signal from the antenna 890 as a radio signal.

The data that has been input through the connector 860 that is provided on the controller 820 is processed by the processor 870 in the same manner as the data described above and is output via the wireless module 880 and the antenna 890 as control data.

As shown in FIG. 13, the gaming device 800 has a controller 820, a gaming device main unit 810, a display 811, and LED modules 812A and 812B. A player 801 can use one hand to grasp the controller 820 to play the game. When the image capture unit 831 of the controller 820 is facing a screen 813 of the display 811, infrared light that is output from the two LED modules 812A, 812B that are disposed near the display 811 is detected by the image capture unit 831, and the controller 820 acquires surface area and position information of the two LED modules 812A, 812B as high-brightness point information. Data concerning the positions and sizes of the bright points is transmitted wirelessly from the controller 820 to the gaming device main unit 810 and is received by the gaming device main unit 810. When the player 801 moves the controller 820, the position and size data of the bright points change, and this change is used in order to allow the gaming device main unit 810 to acquire operational signals corresponding to movement of the controller 820, thereby allowing gaming to progress.

7.5. Body Temperature Measurement Device

Figure 14:
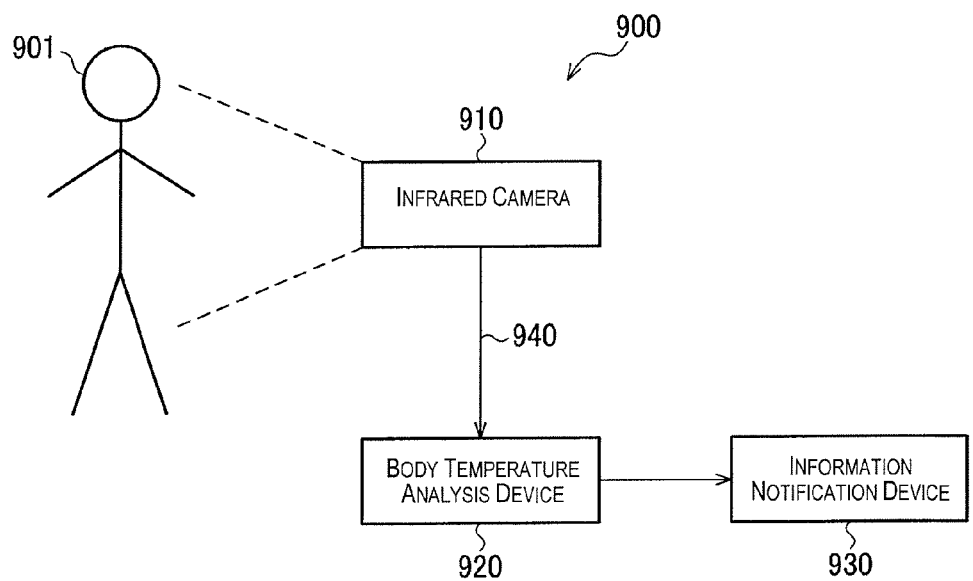
FIG. 14 is a diagram showing a body temperature measurement device (electronic instrument) that has an infrared camera.

FIG. 14 shows an example of the configuration of a body temperature measurement device 900, which is used as an example of the electronic instrument that contains the pyroelectric detector or pyroelectric detection device of this embodiment.

As shown in FIG. 14, the body temperature measurement device 900 has a configuration that comprises an infrared camera 910, a body temperature analysis device 920, an information notification device 930, and a cable 940. The infrared camera 910 has a configuration that comprises an optical system such as a lens (not shown), and the aforementioned sensor device 410.

The infrared camera 910 images a predetermined target region, and image data related to the subject whose image has been captured is transmitted to the body temperature analysis device 920 via the cable 940. The body temperature analysis device 920 (not shown) comprises an image reading processing unit that reads the heat distribution image from the infrared camera 910, and a body temperature analysis unit that generates a body temperature analysis table based on an image analysis settings table together with data from the image reading processing unit; and transmits body temperature transmission data based on the body temperature analysis table to the information notification device 930. This body temperature transmission data may also include prescribed data for when the body temperature is abnormal. When it is determined that a plurality of subjects are in the image capture region, the body temperature transmission data also includes information concerning the number of subjects and the number of persons having an abnormal body temperature.

7.6. Specified Substance Searching Device

Figure 15:
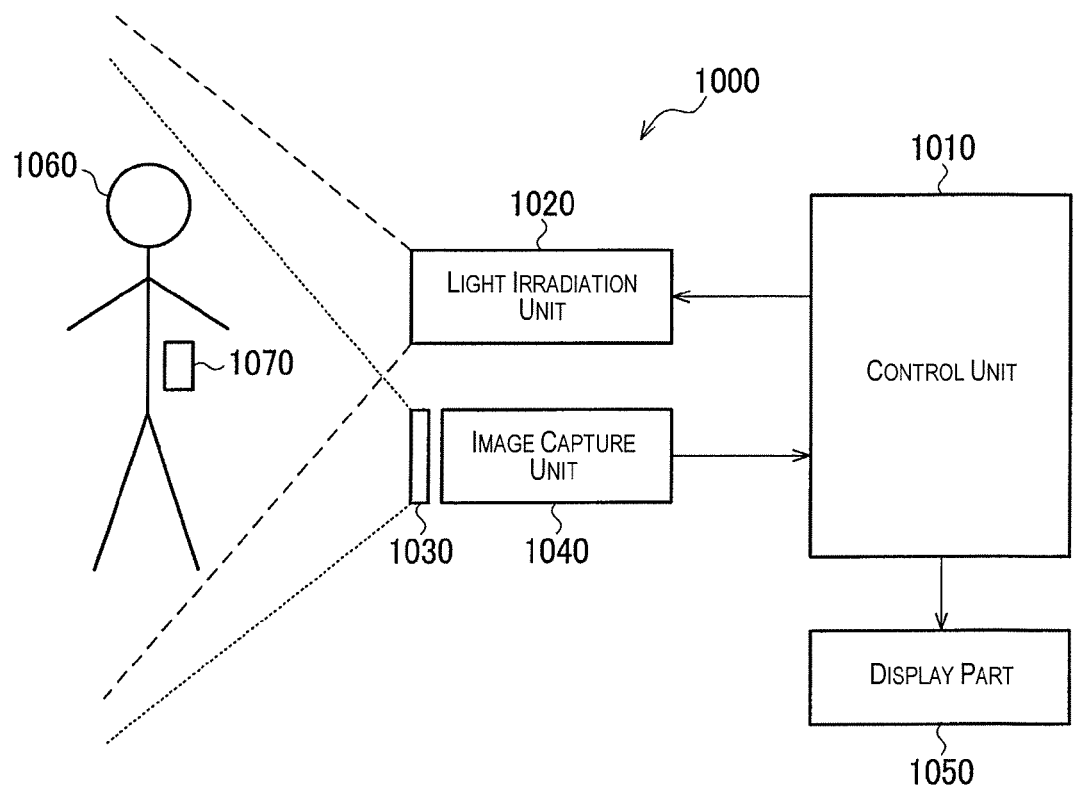
FIG. 15 is a diagram showing an example of a configuration in which the sensor device of FIG. 7 is used as a terahertz sensor device in combination with a terahertz irradiation unit in a special material inspection device (electronic instrument)

FIG. 15 shows an example of the configuration of a specified substance searching device 1000 that combines a terahertz illumination unit along with a terahertz light sensor device in the form of a sensor device having a terahertz range for the absorption wavelengths of the light-absorbing material of the pyroelectric detector of the sensor device 410 described above. This device is used as an example of an electronic device that contains a pyroelectric detector or pyroelectric detection device of this embodiment.

The specified substance searching device 1000 has a configuration that comprises a control unit 1010, an illumination unit 1020, an optical filter 1030, an image capture unit 1040, and a display part 1050. The image capture unit 1040 has a configuration that comprises an optical system such as a lens, and a sensor device having a terahertz absorption wavelength range for the light-absorbing material of the aforementioned pyroelectric detector (neither of which being shown in the drawing).

The control unit 1010 includes a system controller, where the system controller controls the entire device and controls an image processing unit and a light source drive part included in the control unit. The illumination unit 1020 includes an optical system and a laser device that emits terahertz light (electromagnetic radiation in the wavelength range of 100 to 1000 μm), thereby illuminating a person 1060 who is the subject of inspection with terahertz light. The reflected terahertz light from the person 1060 is received by the image capture unit 1040 via the optical filter 1030 that allows only light in the spectrum of a specified substance 1070 that is the target of investigation to pass through. The image signal that is generated by the image capture unit 1040 is subjected to prescribed image processing by the image processing unit of the control unit 1010, and the image signal is output to the display part 1050. The presence of the specified substance 1070 can be determined depending on the intensity of the received light signals which differ depending on whether the specified substance 1070 is present in the clothing or the like of the person 1060.

A number of embodiments of electronic instruments were described above, but the electronic instruments of the embodiments described above are not restricted by the configurations that have been presented, and various modifications may be implemented that involve elimination of some of the constituent elements (e.g., optical system, operational part, display part) and addition of other constituent elements.

8. SENSOR DEVICE

Figure 16A:
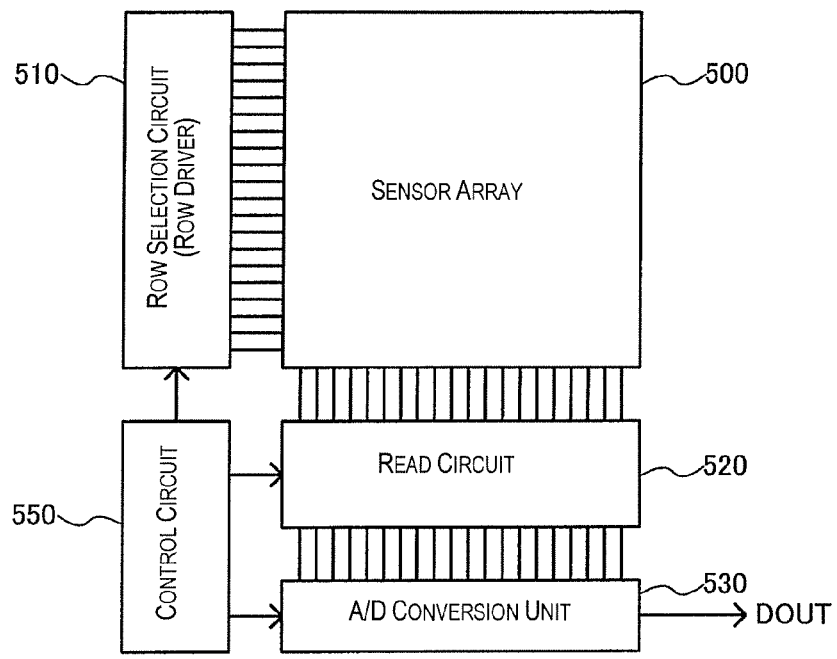
FIGS. 16A and 16B are diagrams showing an example of the configuration of a pyroelectric detection device in which pyroelectric detectors are disposed two-dimensionally.

An example of the configuration of the sensor device 410 of FIG. 7 is shown in FIG. 16A. This sensor device comprises a sensor array 500, a row selection circuit (row driver) 510, and a read circuit 520. The device may also comprise an A/D conversion part 530 and a control circuit 550. The row selection circuit (row driver) 510 and the read circuit 520 are referred to as the "driver circuit." As shown in FIG. 7, this sensor device can be used to realize an infrared camera 400A that is used, for example, in a navigation device.

In the sensor array 500, a plurality of sensor cells are arranged (disposed) along two axes as shown, for example, in FIG. 2. A plurality of rows (word lines, scan lines) and a plurality of columns (data lines) are also provided. The number of either the rows or columns may also be one. For example, when the number of rows is one, a plurality of sensor cells are arranged along the row direction (horizontal direction) in FIG. 16A. On the other hand, when the number of columns is one, a plurality of sensor cells is arranged in the column direction (vertical direction).

Figure 16B:
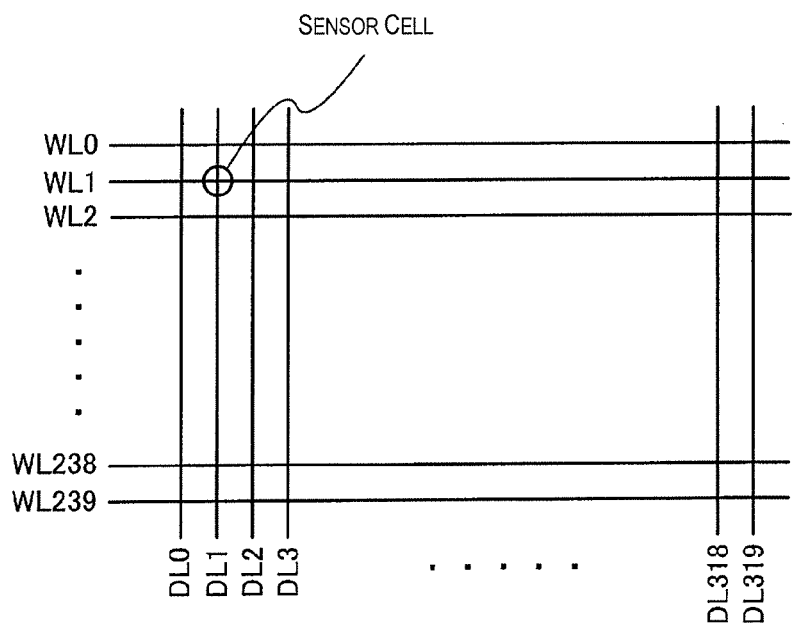

As shown in FIG. 16B, each of the sensor cells of the sensor array 500 is disposed (formed) at a location corresponding to the intersection position of a row and a column. With the sensor cell shown in FIG. 16B, the cell is disposed at a location corresponding to the intersection of the row WL1 and the column DL1. The other sensor cells are similar.

The row selection circuit 510 is connected to one or a plurality of rows and carries out the selection operation for each row. For example, taking the sensor array 500 (focal plan array) of a QVGA (320×240 pixels) device shown in FIG. 16B as an example, operation is carried out by the sequential selection (scanning) of rows WL0, WL1, WL2, . . . WL239. Specifically, signals for selecting these rows (word selection signals) are output to the sensor array 500.

The read circuit 520 is connected to one or a plurality of columns. Read operations are thereby carried out on respective columns. Taking the QVGA sensor array 500 as an example, a read operation is carried out on the detection signals (detected current, detected charge) from the columns DL0, DL1, DL2, . . . DL319.

The A/D conversion part 530 carries out processing whereby the detected voltage (measured voltage, attained voltage) acquired by the read circuit 520 is subjected to A/D conversion to produce digital data. Digital data DOUT is thus output after A/D conversion. Specifically, respective A/D conversion units corresponding to each column of the plurality of columns are provided in the A/D conversion part 530. The respective A/D conversion units carry out A/D conversion on the detected voltages that have been acquired by the read circuit 520 for the corresponding columns. A single A/D conversion unit may also be provided for a plurality of columns, and the detected voltages for the plurality of columns may be subjected to time-division A/D conversion using this single A/D conversion unit.

The control circuit 550 (timing generation circuit) generates various types of control signals which are output to the row selection circuit 510, the read circuit 520, and the A/D conversion part 530. For example, a charge or discharge (reset) control signal is generated and output. Alternatively, a signal that controls the timing for each of the circuits is generated and output.

While only selected embodiments have been described, it will be readily apparent to those skilled in the art from the novel matters and effects of the present invention that numerous modifications may be made herein without substantially departing from the scope of the invention. Consequently, all modifications such as the above may be understood to fall within the scope of the invention. Terms disclosed together with different equivalent or broader terms in at least one instance in the specification or drawings, for example, may be replaced by these different terms at any place in the specification or drawings.

The present invention can be widely utilized in various types of pyroelectric detectors (e.g., thermopile elements (thermopiles) and pyroelectric-type elements) without concern regarding the wavelength of the light that is to be detected. In addition, pyroelectric detectors or pyroelectric detection devices, or electronic instruments that contain them, for example, may be utilized in flow sensors and the like for detecting the flow rate of fluids under conditions in which there is equilibrium between the heat that is given off and the heat that is taken in by the fluid. The pyroelectric detector or pyroelectric detection device of the present invention may be provided instead of a thermocouple or the like in the flow sensor, and the subject for detection can be something other than light.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "top", "bottom", "upper", "lower", "forward", "rearward", "above", "downward", "vertical", "horizontal", "below" and "transverse" as well as any other similar directional terms refer to those directions of the pyroelectric detector when the pyroelectric detector is oriented as shown in FIG. 1. Finally, terms of degree such as "substantially", "about" and "approximately" as used herein mean a reasonable amount of deviation of the modified teem such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A pyroelectric detector comprising:
    a substrate;
    a support member; and
    a pyroelectric detection element supported on the support member, the pyroelectric detection element including
        a capacitor having a first electrode mounted on the support member, a second electrode opposed to the first electrode, and a pyroelectric body disposed between the first and second electrodes, the first electrode being disposed between the second electrode and the substrate with respect to a direction normal to the substrate,
        a first reducing gas barrier layer mounted on the second electrode and covering at least the second electrode and the pyroelectric body of the capacitor, and having a first opening that overlaps the second electrode in plan view, an insulating layer covering at least the first reducing gas barrier layer, and having a second opening that overlaps the first opening of the first reducing gas barrier layer in plan view, a plug disposed in the first opening of the first reducing gas barrier layer and the second opening of the insulating layer with the plug being connected to the second electrode, a second electrode wiring layer formed on the insulating layer and connected to the plug, and a second reducing gas barrier layer formed on the insulating layer and the second electrode wiring layer with the second reducing gas barrier layer covering at least the plug, the second reducing gas barrier layer contacting the plug.

2. The pyroelectric detector according to claim 1, wherein the second reducing gas barrier layer is formed on the insulating layer and the second electrode wiring layer with the second reducing gas barrier layer covering the first reducing gas barrier layer.

3. The pyroelectric detector according to claim 1, wherein the second reducing gas barrier layer is thinner than the first reducing gas barrier layer.

4. The pyroelectric detector according to claim 1, wherein the pyroelectric detection element further includes
   a light-absorbing member disposed in a region further upstream in a light incidence direction than the second reducing gas barrier layer, and
   the second reducing gas barrier layer is formed between the insulating layer and the light-absorbing member.

5. The pyroelectric detector according to claim 4, wherein the pyroelectric detection element further includes a third reducing gas barrier layer covering the light-absorbing member, the third reducing gas barrier layer being thicker than the second reducing gas barrier layer.

6. The pyroelectric detector according to claim 5, wherein the first, second, and third reducing gas barrier layers are made of aluminum oxide.

7. A pyroelectric detection device comprising:
a plurality of the pyroelectric detectors according to claim 1 arranged two-dimensionally along two intersecting axes.

8. A pyroelectric detection device comprising:
a plurality of the pyroelectric detectors according to claim 2 arranged two-dimensionally along two intersecting axes.

9. A pyroelectric detection device comprising:
a plurality of the pyroelectric detectors according to claim 3 arranged two-dimensionally along two intersecting axes.

10. A pyroelectric detection device comprising:
a plurality of the pyroelectric detectors according to claim 4 arranged two-dimensionally along two intersecting axes.

11. A pyroelectric detection device comprising:
a plurality of the pyroelectric detectors according to claim 5 arranged two-dimensionally along two intersecting axes.

12. A pyroelectric detection device comprising:
a plurality of the pyroelectric detectors according to claim 6 arranged two-dimensionally along two intersecting axes.

13. An electronic instrument comprising:
the pyroelectric detector according to claim 1.

14. An electronic instrument comprising:
the pyroelectric detector according to claim 2.

15. An electronic instrument comprising:
the pyroelectric detector according to claim 3.

16. An electronic instrument comprising:
the pyroelectric detector according to claim 4.

17. An electronic instrument comprising:
the pyroelectric detector according to claim 5.

18. An electronic instrument comprising:
the pyroelectric detector according to claim 6.

19. An electronic instrument comprising:
the pyroelectric detection device according to claim 7.

20. An electronic instrument comprising:
the pyroelectric detection device according to claim 8.

* * * * *